Sept. 12, 1967  K. J. HOWES  3,341,154
CONTROL SYSTEMS FOR AIRCRAFT ENGINE INSTALLATIONS
Filed July 30, 1964  4 Sheets-Sheet 1

INVENTOR:
KENNETH JUSTER HOWES

ATTORNEYS:
Hall, Pollock + Vande Sande

United States Patent Office 3,341,154
Patented Sept. 12, 1967

3,341,154
CONTROL SYSTEMS FOR AIRCRAFT ENGINE INSTALLATIONS
Kenneth Juster Howes, Cheltenham, England, assignor to S. Smith & Sons (England) Limited, London, England, a British company
Filed July 30, 1964, Ser. No. 386,282
Claims priority, application Great Britain, Aug. 1, 1963, 30,540/63
19 Claims. (Cl. 244—75)

ABSTRACT OF THE DISCLOSURE

An aircraft engine control system in which demands for thrust components along different axes are applied to servos that regulate thrust magnitude and direction respectively, and in which each servo is provided with degenerative feedback in accordance with the control outputs of both the servos, the feedback function in each servo being in accordance with a computation from these outputs of the magnitude of the actual thrust component along the relevant axis.

---

This invention relates to control systems for aircraft engine installations.

The invention is particularly concerned with control systems for aircraft engine installations of the kind in which thrust produced by the installation is controllable in both magnitude and direction for varying the components of the thrust that act parallel to two mutually inclined axes. Engine installations of this kind are used, for example, in VTOL (vertical take-off and landing) and STOL (short take-off and landing) aircraft to provide mutually inclined propulsive and lift thrust-components which are variable in accordance with demands for horizontal and vertical maneuvers of the aircraft.

According to the present invention, in a control system for an aircraft engine installation of the kind in which thrust produced by the installation is controllable in both magnitude and direction for varying the components of the thrust that act parallel to two mutually inclined axes, two servo systems for effecting control of thrust magnitude and thrust direction due to at least part of the engine installation are arranged to be supplied with two signals that are dependent upon demanded thrust components parallel to the two axes respectively, one of the signals being supplied as an input demand to one of the servo systems and the other signal being supplied as an input demand to the other servo system, and each servo system is arranged to effect its relevant control of the engine installation in dependence upon the difference between the input demand it receives and a function (different in the two cases) which is dependent upon both said thrust magnitude and thrust direction provided by the engine installation.

The engine installation may include one or more vectored-thrust jet engines of the kind having a jet-deflection nozzle the rotation angle of which is variable to vary the direction of thrust produced. One of the servo systems in this case may be arranged to control the setting of a nozzle-angle controller of the one or more engines so as thereby to control the thrust direction. The other servo system may be arranged to control the setting of a throttle controller of the one or more engines so as thereby to control the thrust magnitude. Alternatively, this other servo system may be arranged to effect the control of said thrust magnitude by controlling the amount of a main jet stream, normally used for example for propulsion of the aircraft, which is diverted within the installation to the jet-deflection nozzle.

The control system according to the present invention is applicable to straightforward comparison and control in an aircraft of demanded thrust and achieved acceleration (or other dynamic quantity) parallel to each of the two mutually inclined axes. In this respect, the input demands supplied to the servo systems may each be dependent upon a demand for movement of the aircraft parallel to the relevant axis, such demand being derived, for example, from the manual positioning of a movable control handle which is available to the pilot of the aircraft. The input demand supplied in this case to one servo system may be dependent upon demanded movement of the aircraft parallel to its roll axis, whereas that supplied to the other may be dependent upon demand movement of the aircraft parallel to its yaw axis. In addition, or alternatively, either input demand may be dependent upon a demand for angular movement of the aircraft which is required, for example, to tend to stabilize the aircraft angularly in space, any such angular-stabilization demand being derived for example by an autostabilizer provided in the aircraft. The input demands supplied to the two servo systems may both be dependent upon angular-stabilization demands, the different input demands being dependent upon demands for angular stabilization about different aircraft axes.

It may be arranged that the thrust magnitudes produced by different parts of the engine installation are controlled by different servo systems. For example, where the engine installation comprises four engines the thrust magnitudes of different pairs of the four engines may be controlled by different servo systems. The thrust directions of the different parts of the installation may nevertheless be controlled by a single servo system.

The control system may be used for control of a plurality of aircraft engine installations of the kind in which thrust produced by the installation is controllable in both magnitude and direction. In this case a plurality of pairs of servo systems, one pair for each engine installation, may be provided for controlling the thrust magnitudes and thrust directions.

A control system in accordance with the present invention, for controlling gas turbine jet engine installations of a VTOL aircraft, will now be described by way of example, with reference to the accompanying drawings, in which.

Figure 2:
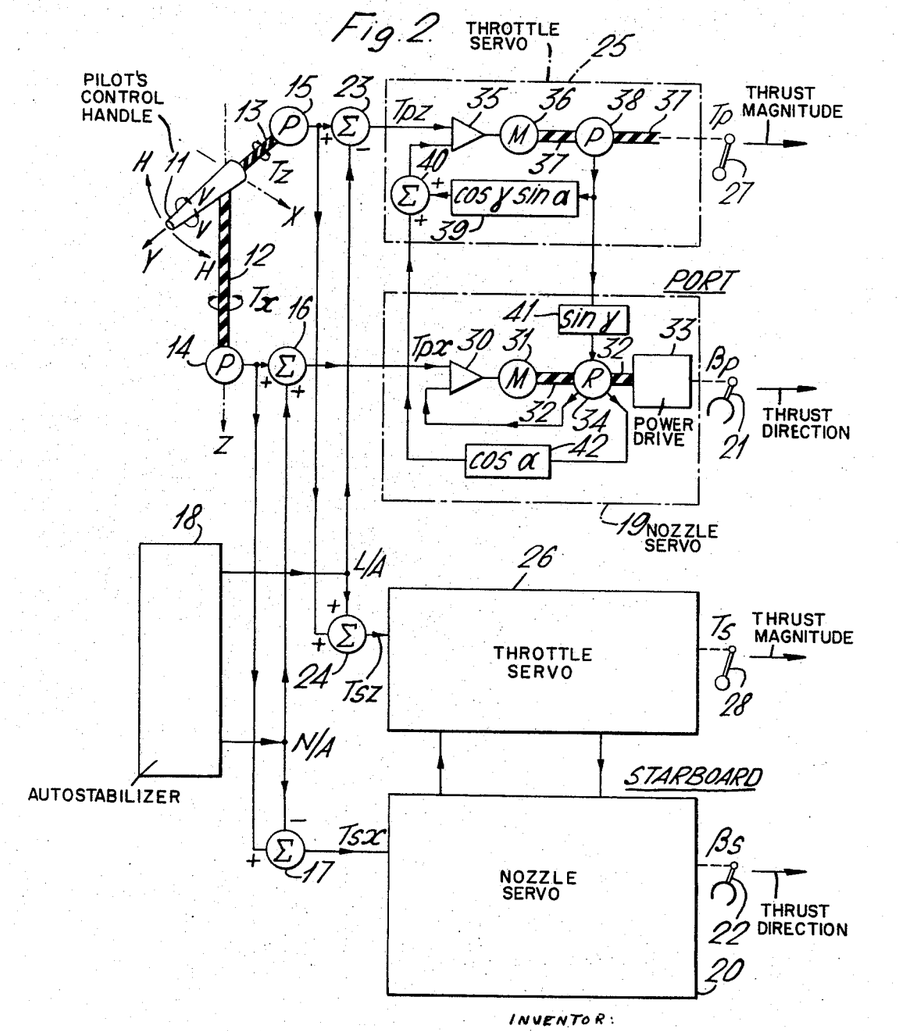
FIGURE 2 is a schematic representation of the control system.
Figure 4:
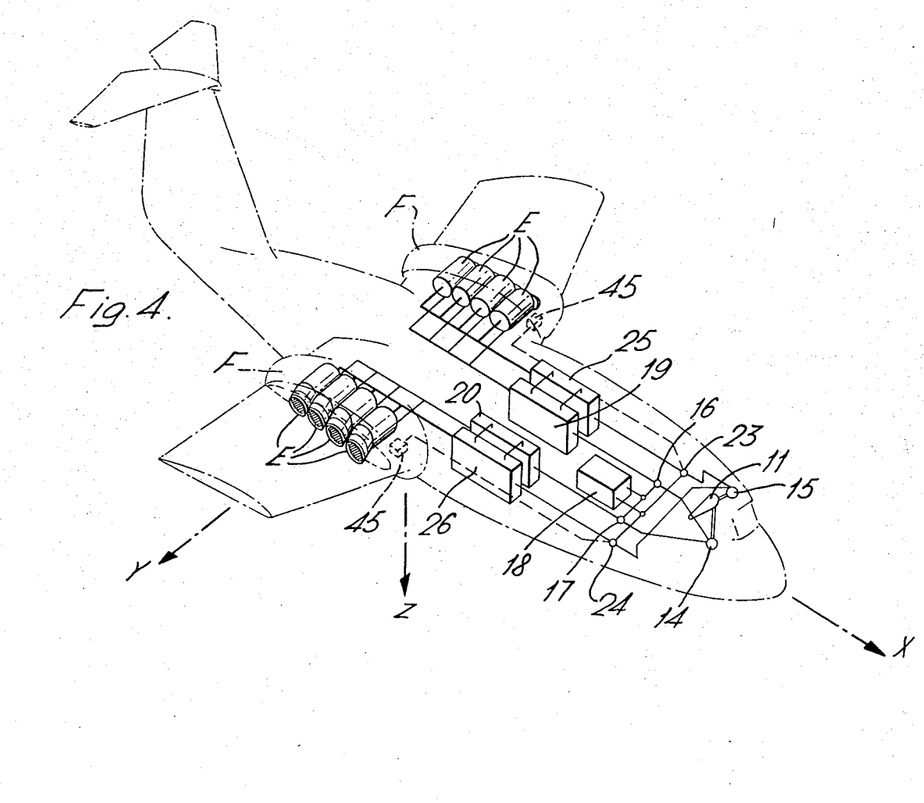
FIGURE 4 is a representation of a VTOL aircraft showing its two engine installations and the associated control system.

As shown in FIGURE 4, the VTOL aircraft of which the control system of FIGURE 2 forms part, has two jet engine installations positioned symmetrically about its roll axis X, with one installation to port and the other to starboard. Each engine installation comprises four substantially identical gas turbine jet engines E, mounted side by side within a common pod F with the jet nozzles of the four engines facing in the same direction as one another, outwardly and downwardly of the aircraft fuselage. The engines are vectored-thrust gas turbines (that is to say gas turbines of the kind for which the direction as well as the magnitude of the thrust produced is variable), and have the dual function of providing thrust components for lift and forward-and-backward propulsion of the aircraft. The aircraft may be maneuvered in roll and yaw by differential variation of the thrust magnitudes or directions, or both, of the two engine installations.

Figure 1:
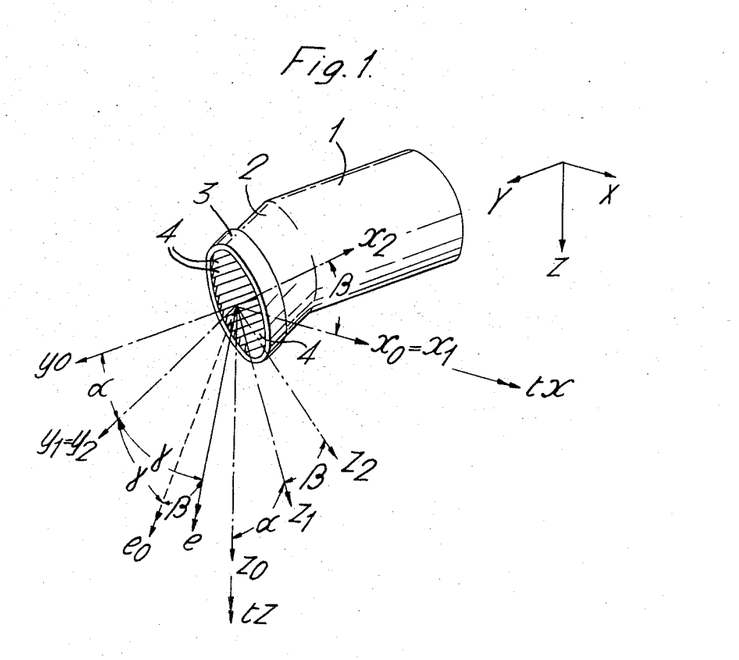
FIGURE 1 shows a perspective view of a gas turbine jet engine of one of the engine installations.

One of the four engines E of the starboard engine installation is shown in FIGURE 1 and will now be described.

Referring to FIGURE 1, the engine has a main-body portion 1 which is generally cylindrical and which contains conventional compressor, combustion, and turbine sections (not shown). The exhaust gas from the turbine section of portion 1 is passed to a downwardly-directed elbow portion 2 of the engine for discharge through a rotatable nozzle 3. The nozzle 3 is formed with a cascade of parallel vanes 4 which are fixedly mounted with respect to one another to produce deflection of the gas jet, the whole cascade of vanes 4 being rotatable with the nozzle 3 so that the resultant direction of the engine efflux is dependent upon the angle of nozzle rotation.

The nozzle 3 is rotatable about the longitudinal axis $y_1$ of the elbow portion 2, the axis $y_1$ being inclined downwardly of the aircraft at an angle $\alpha$ to an axis $y_0$ which is parallel to the pitch axis Y of the aircraft. The plane containing both axes $y_0$ and $y_1$ is parallel to the plane containing the aircraft pitch and yaw axes Y and Z respectively, the axes Y and Z together with the aircraft roll axis X forming a right-handed set of mutually perpendicular axes XYZ of the aircraft. The vanes 4 deflects the gas jet such that the resultant efflux, as represented by a vector $e$, is directed at an angle $\gamma$ to the axis $y_1$, the plane containing the anglye $\gamma$ being variable by varying the angle $\beta$ of rotation of the nozzle 3 about the axis $y_1$. The angle $\beta$ is measured from the datum position in which the vanes 4 are parallel to the roll axis X and in which the angle $\gamma$ is contained in the plane of the axes $y_0$ and $y_1$, the direction of the efflux in this instance being as represented by vector $e_0$.

The thrust $t$ on the aircraft which is produced by the efflux from the engine is in the opposite sense to the vector $e$. Variation of the direction of the efflux vector $e$, by rotating the nozzle 3 and thereby varying the angle $\beta$, results in variation in components $t_x$ and $t_z$ of the thrust vector $t$ which act parallel to the axes X and Z repective ly and which produce, in their notional positive senses, forward propulsion and "negative-lift" (that is, downward propulsion) of the aircraft. The sense of the angle $\beta$ determines the sense of the propulsive component $t_x$ and thus, whether this component acts to propel the aircraft forward or backward. The propulsive component $t_x$ is zero when the angle $\beta$ is zero, whereas the lift $t_z$ is zero when the angle $\beta$ is ninety degrees.

The magnitudes of the components $t_x$ and $t_z$ are computed using three right-handed sets of mutually perpendicular axes $x_0 y_0 z_0$, $x_1 y_1 z_1$, and $x_2 y_2 z_2$, indicated in FIGURE 1. The set of axes $x_0 y_0 z_0$ correspond to the set of aircraft axes XYZ, with the axis $y_0$, as stated above, parallel to the axis Y and the axes $x_0$ and $z_0$ parallel to the axes X and Z respectively. The set of axes $x_1 y_1 z_1$, for which the axis $y_1$ is the rotational axis of the nozzle 3, is defined as being derived from the set of axes $x_0 y_0 z_0$ by a rotation through the angle $\alpha$ about the axis $x_0$, the axis $x_1$ consequently being colinear with the axis $x_0$. The set of axes $x_2 y_2 z_2$, on the other hand, is derived from the set of axes $x_1 y_1 z_1$ by a rotation through the angle $\beta$ about the axis $y_1$, the axis $x_2$ thereby being parallel to the vanes 4 and the axis $y_2$ colinear with the axis $y_1$.

The components of the thrust vector $t$ which act along the axes $x_2$, $y_2$, and $z_2$ are respectively:

$$0$$
$$-t \cos \gamma$$
$$-t \sin \gamma$$

Resolving these components along the axes $x_1$, $y_1$, and $z_1$, the corresponding values are:

$$-t \sin \gamma \sin \beta$$
$$-t \cos \gamma$$
$$-t \sin \gamma \cos \beta$$

Finally, resolving these components along the axes $x_0$, $y_0$, and $z_0$, the values are:

$$-t \sin \gamma \sin \beta \quad (1)$$

$$-t(\cos \gamma \cos \alpha - \sin \gamma \cos \beta \sin \alpha)$$
$$-t(\sin \gamma \cos \beta \cos \alpha + \cos \gamma \sin \alpha) \quad (2)$$

Thus the value of the propulsive thrust component $t_x$ is given by function (1), and that of the lift thrust component $t_z$ by function (2).

The fixed angles $\alpha$ and $\gamma$ are the same for all engines E of the two installations. In addition within each installation the same thrust magnitude $t$ and nozzle rotation angle $\beta$ is used for all four engines, and in this respect the four engines of the installation act, and are controlled, as one. The combined thrust $T_s$ of the engines in the starboard engine installation acting with a nozzle rotation angle $\beta_s$, gives rise to a combined forward propulsive thrust component $T_{sx}$ given by:

$$-T_s \sin \gamma \sin \beta_s \quad (3)$$

and a combined negative-lift thrust component $T_{sz}$ given by:

$$-T_s (\sin \gamma \cos \beta_s \cos \alpha + \cos \gamma \sin \alpha) \quad (4)$$

Similarly, the combined thrust $T_p$ of the engines in the port engine installation acting with a nozzle rotation angle $\beta_p$, gives rise to a combined forward propulsive thrust component $T_{px}$ given by:

$$-T_p \sin \gamma \sin \beta_p \quad (5)$$

and a combined negative-lift thrust component $T_{pz}$ given by:

$$-T_p (\sin \gamma \cos \beta_p \cos \alpha + \cos \gamma \sin \alpha) \quad (6)$$

The total forward propulsive thrust component $T_x$ and the total negative-lift thrust component $T_z$ are respectively:

$$T_{sx} + T_{px} \quad (7)$$
$$T_{sz} + T_{pz} \quad (8)$$

In addition, owing to the positioning of the engine installations at a distance A, say, on either side of the roll and yaw axes X and Z, the aircraft is subject to a yawing moment N and a rolling moment L equal respectively to:

$$A(T_{px} - T_{sx}) \quad (9)$$
$$-A(T_{pz} - T_{sz}) \quad (10)$$

Using functions (7) to (10):

$$T_{px} = \tfrac{1}{2}(T_x N/A) \quad (11)$$
$$T_{pz} = \tfrac{1}{2}(T_z - L/A) \quad (12)$$
$$T_{sx} = \tfrac{1}{2}(T_x - N/A) \quad (13)$$
$$T_{sz} = \tfrac{1}{2}(T_z + L/A) \quad (14)$$

The control of the engine installations is effected by using values of $T_{px}$, $T_{pz}$, $T_{sx}$, and $T_{sz}$, derived in accordance with Equations 11 to 14, as input demands to four servo systems. Two of the servo systems control respectively a throttle controller and a nozzle-angle controller of the port installation, and the other two, similarly, control throttle anr nozzle-angle controllers of the starboard installation. The values of $T_x$ and $T_z$ in the computation are derived in direct dependence upon forward and downward acceleration components demanded by the pilot of the aircraft, whereas the values of $N/A$ and $L/A$ are derived from demand signals provided by an autostabilizer of the aircraft. The construction of the control system and the manner in which it provides the required control of the two engine installations will now be described with reference to FIGURE 2.

Referring now especially to FIGURE 2, a control handle 11 extends transversely of the aircraft at the pilot's position and is pivoted about an axis parallel to the axis Z for movement by the pilot forward or backward, as indicated by arrows H, according to desired forward or backward movement of the aircraft. The control handle 11 is also rotatable about its longitudinal axis in either sense, as indicated by arrows V, according to desired upward or downward movement of the aircraft. Two shafts 12 and 13 are coupled to the control handle 11 such that the shaft 12 is rotated in accordance with the backward-forward movement H of the handle 11, and the shaft 13 is rotated in accordance with the handle rotation V. The angle of rotation of the shaft 12 accordingly provides a measure, in magnitude and sense, of demanded propulsive thrust $T_x$, and the angle of rotation of the shaft 13 provides a corresponding measure of demanded lift thrust $T_z$. Electric signals dependent upon the demanded values of $T_x$ and $T_z$ are derived by two pick-off devices, such devices in the present example being provided by potentiometers 14 and 15 which have their rotors coupled to the shafts 12 and 13 respectively.

The signal derived by the potentiometer 14, which signal is dependent upon the demanded value of $T_x$, is supplied to two summing amplifiers 16 and 17 both of which also receive from an autostabilizer 18 an electric signal which is dependent upon a demanded force $N/A$ (parallel to the roll axis X) required for maneuvering and stabilizing the aircraft in yaw. The amplifier 16, in response to the two signals it receives, supplies an output signal representative of $T_{px}$ as given by Equation 11, whereas the amplifier 17 supplies an output signal representative of $T_{sx}$ as given by Equation 13. The signals supplied by the two amplifiers 16 and 17 are passed as input demand signals to two servo systems 19 and 20 respectively which effect control of the nozzle-rotation angles $\beta_p$ and $\beta_s$ of the two engine installations. The servo system 19 controls a common nozzle-angle controller 21 of the port installation, and the servo system 20 controls a common nozzle-angle controller 22 of the starboard installation.

The signal which is derived by the potentiometer 15, which signal is dependent upon the demanded value of $T_z$, is supplied to two summing amplifiers 23 and 24 both of which also receive, from the autostabilizer 18, an electric signal which is dependent upon a demanded force $L/A$ (parallel to the yaw axis Z) required for maneuvering and stabilizing the aircraft in roll. The amplifier 23, in response to the two signals it receives, supplies an output signal representative of $T_{pz}$ as given by Equation 12, whereas the amplifier 24 supplies an output signal representative of $T_{sz}$ as given by Equation 14. The signals supplied by the amplifiers 23 and 24 are passed as input demand signals to two servo systems 25 and 26 repectively which effect control of the magnitudes of the thrusts $T_p$ and $T_s$ produced by the two installations. In this respect, the servo system 25 controls a common throttle controller 27 of the port installation, whereas the servo system 26 controls a common throttle controller 28 of the starboard installation.

The autostabilizer 18 is basically a conventional roll-and-yaw autostabilizer in that is includes gyro arrangements (not shown) for providing information as to movements of the aircraft about the roll and yaw axes X and Z. However, in the present instance, at low speeds where the aerodynamic contol surfaces of the aircraft become ineffective, maneuvers of the aircraft in roll and yaw can be achieved by suitable control of the two engine installations. Accordingly, provision (not shown) is made with the autostabilizer 18 for the pilot to exercise control in accordance with desired changes of attitude of the aircraft in roll and yaw. In this respect the autostabilizer 18 is effectively one for enabling stabilization in roll and yaw with respect to a datum attitude which is selectively variable, the datum attitude being varied to correspond to the attitude in roll and yaw selected by the conventional pilot's controls of the aircraft. The output demands ($N/A$ and $L/A$) of the autostabilizer 18 are therefore demands for maneuvering and stabilizing the aircraft in roll and yaw relative to the selected attitude.

The pair of servo systems 20 and 26 which effect control of the nozzle-rotation and throttle controllers 22 and 28 of the starboard installation are of the same construction as the corresponding pair of servo systems 19 and 25 of the port installation. Accordingly, only one pair, those of the port installation, are shown and described in detail.

The servo system 19 includes a servo amplifier 30 that receives from the amplifier 16 the input demand signal dependent upon $T_{px}$ and controls energization of a servo motor 31. The motor 31, under control of the servo amplifier 30, drives a shaft 32 to a rotational position that provides an analogue representation of the angle $\beta_p$ consistent with the input demand signal. The rotational position of the shaft 32 is conveyed to the port engine installation via a power control system 33 which drives the controller 21, the port engine nozzles being thereby set at angle $\beta_p$ in accordance with the rotational position of the shaft 32. A resolver 34 has its rotor coupled to the shaft 32 for providing, as referred to below, resolutions involving the variable terms (sin $\beta_p$) and (cos $\beta_p$) which are required for appropriate feedback-control of the two servo systems 19 and 25.

The servo system 25 includes a servo amplifier 35 that receives from the amplifier 23 the input demand signal dependent upon $T_{pz}$ and controls energization of a servo motor 36. The motor 36, under control of the servo amplifier 35, drives a shaft 37 to a rotational position that provides an analogue representation of the thrust $T_p$ consistent with the input demand signal. The rotational position of the shaft 37 is conveyed to the throttle controller 27 of the port engine installation so as to effect a throttle setting appropriate to the production by that installation of thrust magnitude $T_p$. A pick-off device 38 has its rotor coupled to the shaft 37 and derives an electric signal dependent upon the rotational position of the shaft 37, the signal in fact providing a measure of ($-T_p$). This latter signal is supplied via a scaling network 39 to a summing amplifier 40, and also via a scaling network 41 to the resolver 34 of the servo system 19. The scaling networks 39 and 41 provide attenuations dependent upon the constants (cos $\gamma$ sin $\alpha$) and (sin $\gamma$) respectively, so the signal supplied to the amplifier 40 via the network 39 provides a measure of:

$$-T_p \cos \gamma \sin \alpha$$

whereas that supplied to the resolver 34 via the network 41 provides a measure of:

$$-T_p \sin \gamma$$

Two signals are derived by the resolver 34 of the servo system 19 from the signal it receives, one of these signals, by virtue of the above-mentioned resolution that involves (sin $\beta_p$), being dependent upon $T_{px}$ as given by function (5), and being supplied to the servo amplifier 30 as degenerative feedback. The other signal derived by the resolver 34 is, by virtue of the resolution that involves (cos $\beta_p$), dependent upon:

$$-T_p \sin \gamma \cos \beta_p$$

and is supplied to the amplifier 40 via a scaling network 42 having an attenuation dependent upon the constant (cos $\alpha$). The output signal of the amplifier 40, being dependent upon the sum of the signals received via the networks 39 and 42, is accordingly dependent upon $T_{pz}$ as given by function (6) and this signal is supplied to the servo amplifier 35 as degenerative feedback.

The degenerative feedback dependent upon $T_{px}$ supplied to the servo amplifier 30 in the servo system 19 is dependent upon the angular position of both shafts 32 and 37, and in this respect is dependent upon both the actual nozzle-angle $\beta_p$ and the actual thrust $T_p$. There is a difference in magnitude between this signal and the input demand signal supplied to the servo amplifier 30 if there is any inconsistency between, on the one hand, the actual nozzle-angle $\beta_p$ and thrust $T_p$, and, on the other hand, the demanded propulsive thrust $T_{px}$ and yawing force $N/A$. Such difference results in energization of the motor 31 to rotate the shaft 32 in a sense to tend to reduce the difference to zero. In this connection however, rotation of the shaft 32 results in variation of the degenerative feedback signal dependent upon $T_{pz}$ supplied to the servo amplifier 35 of the servo system 25, such feedback signal being, like that supplied to the servo amplifier 30, dependent upon both the actual nozzle-angle $\beta_p$ and the actual thrust $T_p$. Thus, if there is any inconsistency between, on the one hand, the actual nozzle-angle $\beta_p$ and thrust $T_p$, and, on the other hand, the demanded lift thrust $T_{pz}$ and rolling force $L/A$, there is a difference between the input demand signal and the degenerative feedback supplied to the amplifier 35. Such difference results in energization of the motor 36 to rotate the shaft 37 in a sense to tend to reduce the difference to zero, and this will of course result in variation of the degenerative feedback signal supplied to the amplifier 30. The resultant effect however, is that the two servo systems 19 and 25 tend to rotate the shafts 32 and 37 to produce an actual nozzle-angle $\beta_p$ and an actual thrust $T_p$ which are consistent with all four demands $T_{px}$, $T_{pz}$, $N/A$, and $L/A$.

The servo systems 20 and 26 similarly operate to produce, in respect of the starboard engine installation, an actual nozzle-angle $\beta_s$ and an actual thrust $T_s$ which are consistent with all four demands $T_{sx}$, $T_{sz}$, $N/A$, and $L/A$.

In order to control the acceleration of the aircraft parallel to its yaw axis Z and, or alternatively, to improve its stability in roll, it may be arranged that the input demands supplied to the servo systems 25 and 26 include components which are dependent upon accelerations of the aircraft measured parallel to, and on either side of, the yaw axis Z. To this end, and as indicated in broken lines in FIGURE 4, the output signal of the amplifier 23 may have added to it a signal derived by an accelerometer 45 positioned at the port engine installation, and the output signal of the amplifier 24 may have added to it a signal derived by an accelerometer 45 positioned at the starboard engine installation, each such signal being dependent upon acceleration parallel to the yaw axis Z at the relevant installation. The accelerometer signal in each case may be added directly to the amplifier output signal before this latter signal is supplied to the servo system (as indicated in FIGURE 4), or may be supplied independently to the servo amplifier 35 of the servo system to be there effectively added to said amplifier output signal. When the accelerometer signals are used, rotational movement of the control 11 in the direction of either arrow V effectively demands vertical acceleration (assuming that the feedback gain is sufficiently high). In these circumstances, as the aerodynamic lift decreases with reducing airspeed during an approach to a VTOL landing the throttles of the port and starboard lift engines will be opened steadily by the control system, such system acting thereby to maintain a constant rate of descent. Strickly, the accelerometers 45 measure the acceleration parallel to the aircraft axis Z, whereas it is the acceleration normal to the flight path in the vertical plane which is required for lift control. However, provided the angle of incidence and the bank angle of the aircraft are not excessive, this is not usually important.

The thrust from each individual engine is monitored (by means not shown) using engine-pressure sensors, so that disturbances due to engine failures and due to gusts can be distinguished from one another. The monitoring is performed by comparing the individual pressure signals with a mean value. Provided the differences are within acceptable limits, the demands for throttle control are restricted to avoid driving the engines up to their emergency rating. If there is an engine failure, the restriction is overruled to ensure that adequate rolling moment is available to counter the loss of thrust from the relevant installation. The thrust levels are displayed to the pilot so that he can subsequently identify, and shut-off the fuel to, the failed engine, and also throttle-back the corresponding engine in the other installation.

The engine control system described above with reference to FIGURE 2 is effective to maneuver the aircraft in roll and yaw but not in pitch, pitch maneuvers being in this case effected by means of pressurized-air jets at the tail end of the aircraft. If desired however, the engine control system may be extended to include a facility for achieving pitch maneuvers by differential variation of the thrusts of fore and aft pairs of engines in both installations.

Figure 3:
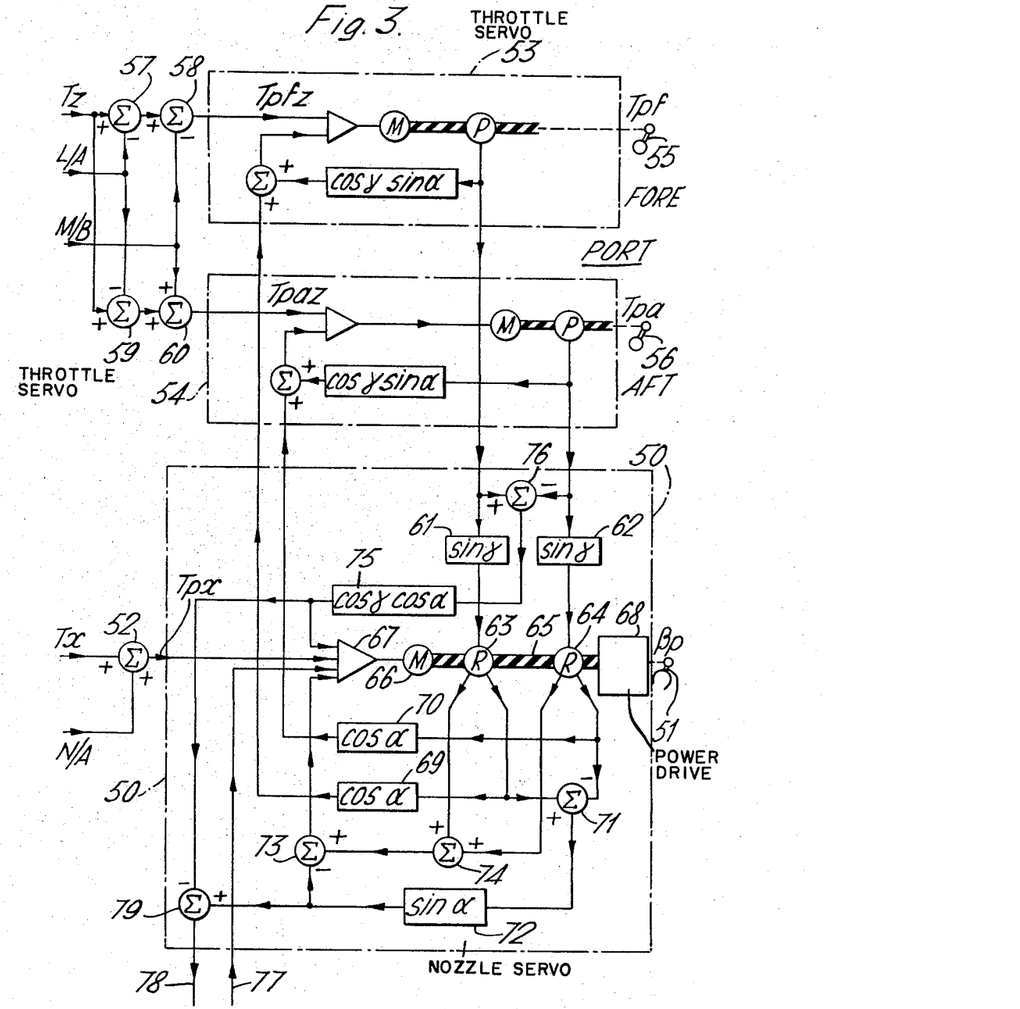
FIGURE 3 is a schematic representation of part of a modified form of the control system of FIGURE 2.

An example of the form of the engine control system of FIGURE 2 when modified to include a pitch maneuvering facility such as referred to in the preceding paragraph, is partly shown in FIGURE 3 and will now be described. In FIGURE 3 there is shown only that part of the system which is specifically concerned with control of the port engine installation, the part specifically concerned with control of the starboard engine installation being, as in the case of the system shown in FIGURE 2, the same. Demands for forward, downward, roll, and yaw maneuvers are derived in the system in exactly the same manner as for the system of FIGURE 2, signals representative of forward and downward demands $T_x$ and $T_z$ respectively being provided in dependence upon manipulation of a pilot's control handle (not shown) corresponding to the handle 11 of FIGURE 2, and signals representative of yaw and roll demands $N/A$ and $L/A$ being provided by an autostabilizer (not shown) corresponding to the autostabilizer 18 of FIGURE 2. In the present case however, the datum attitude to which operation of the autostabilizer is related is varied to correspond in pitch as well as in roll and yaw to the attitude selected by the pilot's conventional controls, and the autostabilizer provides an output demand $M/B$ for use in maneuvering and stabilizing teh aircraft in pitch, M being the pitching moment required, and 2B the effective separation, measured parallel to the roll axis X, of the fore and aft pairs of engines in each engine installation.

Three interconnected servo systems are used for each engine installation, one to control a nozzle-angle controller that is common to both pairs of engines of the installation, the same nozzle-rotation angle $\beta_p$ being used for all four engines of the port installation, and the same nozzle-rotation angle $\beta_s$ for all four engines of the starboard installation. The other two servo systems of each installation control two throttle controllers respectively, one of these controllers controlling the throttle setting of the fore pair of engines and the other the throttle setting of the aft pair of engines. The fore and aft pairs of engines of the port installation produce under control of their respective throttle controllers thrusts $T_{pf}$ and $T_{pa}$, whereas the fore and aft pairs of engines of the starboard installation correspondingly produce thrusts $T_{sf}$ and $T_{sa}$.

The demands applied to the servo systems that control the nozzle-angles $\beta_p$ and $\beta_s$ are the same as those, $T_{px}$ and $T_{sx}$, given by Equations 11 and 13 above. The demands, $T_{pfz}$, $T_{paz}$, $T_{sfz}$, and $T_{saz}$, applied to the servo systems that control respectively the thrust magnitudes $T_{pf}$, $T_{pa}$, $T_{sf}$, and $T_{sa}$ are given by the following equations:

$$T_{pfz} = \tfrac{1}{4}(T_z - L/A - M/B) \quad (15)$$
$$T_{paz} = \tfrac{1}{4}(T_z - L/A + M/B) \quad (16)$$
$$T_{sfz} = \tfrac{1}{4}(T_z + L/A - M/B) \quad (17)$$
$$T_{saz} = \tfrac{1}{4}(T_z + L/A + M/B) \quad (18)$$

These demands are compared in their respective servo systems with computed values derived from the actual values of the servo output variables. The comparisons are effected using the computed values as degenerative feedback applied against the input demands so that the values of the various servo output variables are maintained consistent with all the input demands. The values of the demands $T_{px}$, $T_{sx}$, $T_{pfz}$, $T_{paz}$, $T_{sfz}$ and $T_{saz}$ are computed respectively according to the following functions:

$$(T_{pf}+T_{pa}) \sin \gamma \sin \beta_p + (B/A)[(T_{pf}-T_{pa})F_p + (T_{sf}-T_{sa})F_s] \quad (19)$$

$$(T_{sf}+T_{sa}) \sin \gamma \sin \beta_s - (B/A)[(T_{pf}-T_{pa})F_p + (T_{sf}-T_{sa})F_s] \quad (20)$$

$$T_{pf}G_p \quad (21)$$

$$T_{pa}G_p \quad (22)$$

$$T_{sf}G_s \quad (23)$$

$$T_{sa}G_s \quad (24)$$

where $F_x$ and $G_x$ ($x$ being either $p$ or $s$) are respectively the functions:

$$\cos \gamma \cos \alpha - \sin \gamma \sin \alpha \cos \beta_x$$
$$\cos \gamma \sin \alpha + \sin \gamma \cos \alpha \cos \beta_x$$

Referring to FIGURE 3, the servo system 50 that controls nozzle-angle controller 51 of the port engine installation is supplied with input demand $T_{px}$, this being derived in accordance with Equation 11 by a summing amplifier 52 from the signals representative of demands $T_x$ and $N/A$. The two servo systems 53 and 54 that control throttle-controllers 55 and 56 respectively of the fore and aft pairs of port engines, on the other hand, receive input demands $T_{pfz}$ and $T_{paz}$. These two demands are in accordance with Equations 15 and 16 and are derived from the signals representative of demands $T_z$, $M/B$, and $L/A$ by pairs of summing amplifiers 57 and 58, and 59 and 60.

Each of the servo systems 53 and 54 is the same in construction as the servo system 25 of FIGURE 2, and accordingly each supplies to the servo system 50 a signal representative of the actual thrust magnitude, $T_{pf}$ or $T_{pa}$, of its relevant engine pair. The two signals representative of $T_{pf}$ and $T_{pa}$ are applied in the servo system 50 to two scaling networks 61 and 62 respectively that both provide attenuations dependent upon (sin $\gamma$). The signals derived by the networks 61 and 62 are applied respectively to two resolvers 63 and 64 coupled to a shaft 65 of the servo system 50.

The shaft 65 in the servo system 50 corresponds to the shaft 32 of the servo system 19 of FIGURE 2 and is likewise driven to a rotational position representative of nozzle-angle $\beta_p$ by a motor 66 under control of a servo amplifier 67 that receives the input demand $T_{px}$. The rotational position of the shaft 65 is conveyed via a power control system 68 to drive the controller 51, the port engine nozzle being thereby set at the angle $\beta_p$.

Each of the resolvers 63 and 64 coupled to shaft 65 provides two resolutions of the signal it receives from the relevant network 61 or 62, a first resolution involving the variable term (cos $\beta_p$) and the second the variable term (sin $\beta_p$). The signals derived by the first resolutions in the resolvers 63 and 64 are supplied respectively via scaling networks 69 and 70 to the servo systems 53 and 54. Each network 69 and 70 has an attenuation dependent upon (cos $\alpha$) with the result that each servo system 53 and 54 receives from the servo system 50 a signal comparable with the signal which, in the system of FIGURE 2, is received by the servo system 25 from the servo system 19. These signals received by the servo systems 53 and 54 are used within these systems to provide degenerative-feedback control based on functions (21) and (22), the arrangement for this in each case corresponding to that provided and described above in the servo system 25 of FIGURE 2.

The two signals derived by the said first resolutions in the resolvers 63 and 64 are also supplied to a summing amplifier 71 that derives therefrom a signal dependent upon:

$$(T_{pf}-T_{pa}) \sin \gamma \cos \beta_p$$

This signal is supplied via a scaling network 72 that has an attenuation dependent upon the constant (sin $\alpha$), to a summing amplifier 73 which also receives from a further summing amplifier 74 a signal dependent upon:

$$(T_{pf}+T_{pa}) \sin \gamma \sin \beta_p$$

This latter signal is derived in the summing amplifier 74 from the two signals which result from the said second resolutions provided by the resolvers 63 and 64.

The signal which is derived by the amplifier 73 from the signals it receives from the amplifier 74 and the network 72 is dependent upon:

$$(T_{pf}+T_{pa}) \sin \gamma \sin \beta_p - (B/A)(T_{pf}-T_{pa})(\sin \gamma \sin \alpha \cos \beta_p)$$

This signal is supplied degeneratively to the servo amplifier 67 and constitutes one of three components of the degenerative-feedback control given by function (19) and provided in the servo system 50. The other two components are provided by signals dependent respectively upon:

$$(B/A)(T_{pf}-T_{pa}) \cos \gamma \cos \alpha$$

$$(B/A)(T_{sf}-T_{sa})(\cos \gamma \cos \alpha - \sin \gamma \sin \alpha \cos \beta_s)$$

The first of these two signals supplied degeneratively to the amplifier 67 from a scaling network 75 which has an attenuation dependent upon the constant (cos $\gamma$ and $\alpha$), and which is supplied from a summing amplifier 76 with a signal that is dependent upon the difference between the signals representative of $T_{pf}$ and $T_{pa}$ provided by the servo systems 53 and 54.

The second of the two feedback signals is supplied via a lead 77 from the servo system (not shown) which controls the starboard nozzle-angle, the servo system 50 correspondingly supplying to that servo system a signal representative of:

$$(B/A)(T_{pf}-T_{pa})(\cos \gamma \cos \alpha - \sin \gamma \sin \alpha \cos \beta_p)$$

for use in providing degenerative-feedback control according to function (20). This latter signal, which is supplied via a lead 78, is derived in the servo system 50 by a summing amplifier 79 from the signals supplied by the scaling networks 72 and 75.

As is the case of the system of FIGURE 2, components dependent upon accelerations of the aircraft parallel to the yaw axis Z may be included in the input demands to the servo systems 53 and 54 controlling the throttles of the port engines, and in the input demands to the corresponding servo systems controlling the throttles of the starboard engines. In this case an individual accelerometer is provided for each fore and aft pair of engines.

Although in the systems of FIGURES 2 and 3 autostabilization is used only in respect of angular movements of the aircraft, it will be appreciated that autostabilization may also be used in respect of the linear movements of the aircraft. For example in each case two linear movement demands $T_x$ and $T_z$ may be modified respectively in accordance with stabilization-demand signals provided by the autostabilizers. The demand provided by one autostabilizer and used to modify the pilot's demand $T_x$ is that required to effect stabilization along the roll axis X, and the demand provided by the other autostabilizer and used to modify the pilot's demand $T_z$ is that required to effect stabilization along the yaw axis Z. Each of these two autostabilizers may be arranged to receive the relevant pilot's-demand signal and, as modifying it by adding the relevant stabilization demand, may also effect whatever shaping of the pilot's demand is required to ensure that even if the pilot is too abrupt in his manipulation of the control handle 11 the response of the aircraft is smooth. Additionally, of course, the acceleration signals provided by the accelerometers referred to above may, where appropriate, be routed through the autostabilizers for shaping purposes.

It will be appreciated that for safety reasons it may be desirable to adopt multiplex or multiplicated techniques, so that for example in the case of the system of FIGURE 2 each servo system shown is one of two or three identical servo systems all arranged to perform the same function.

I claim:

1. A control system for an aircraft engine installation of the kind in which thrust produced by the installation is controllable in both magnitude and direction for varying the components of the thrust that act along two mutually inclined axes, comprising: first means for supplying a first signal dependent upon demanded thrust magnitude parallel to a first of said axes; second means for supplying a second signal dependent upon demanded thrust magnitude parallel to the second of said axes; first and second servo systems for providing control outputs for controlling the thrust magnitude and thrust direction due to at least part of said engine installation; means for supplying said first signal as an input demand to said first servo system; and means for supplying said second signal as an input demand to said second servo system; said first servo system including feedback means responsive to said control outputs of both said first and second servo systems for providing degenerative feedback in said first servo system in accordance with a predetermined first function of both said thrust magnitude and thrust direction provided by the installation; and said second servo system including feedback means responsive to said control outputs of both the first and second servo systems for providing degenerative feedback in said second servo system in accordance with a predetermined second function of both said thrust magnitude and thrust direction provided by the installation.

2. A control system according to claim 1 for an engine installation that includes at least one vectored-thrust jet engine of the kind having a jet-deflection nozzle the rotational angle of which is variable to vary the thrust direction, and a throttle the setting of which is variable to vary the thrust magnitude, said first servo system being operative to control said throttle setting, and said second servo system being operative to control the rotational setting of said nozzle.

3. A control system according to claim 2 including means for providing two demands for substantially vertical and horizontal movements respectively of the installation, said first means being responsive to said vertical-movement demand for providing said first signal dependent upon said vertical-movement demand, and said second means being responsive to said horizontal-movement demand for providing said second signal dependent upon said horizontal-movement demand.

4. A control system according to claim 1 including means responsive to the values of said control outputs of said two servo systems for deriving further signals that are dependent upon three values, means responsive to said further signals to compute values of the components of actual thrust acting parallel to said first and second axes, means for applying in said first servo system degenerative feedback in accordance with the computed value of the component of the actual thrust acting parallel to said first axis, and means for applying in said second servo system degenerative feedback in accordance with the computed value of the component of the actual thrust acting parallel to said second axis.

5. A control system according to claim 4 wherein each said servo system includes a rotatable shaft, and electrical servo motor for rotating said shaft, an electrical servo amplifier for controlling energization of said motor in accordance with the difference between the input demand and the degenerative feedback of the servo system, and an electrical device which is coupled to said shaft for providing an electrical response dependent upon the rotational position of said shaft, said means for applying degenerative feedback in said first servo system and said means for applying degenerative feedback in said second servo system together including, in common, means electrically interconnecting the said electrical devices of said first and second servo systems to derive an electrical signal in accordance with both the rotational position of the shaft of said first servo system and the rotational position of the shaft of said second servo system.

6. In an aircraft, a control system according to claim 1 wherein the input demand to said first servo system is dependent upon a demand for movement of the aircraft parallel to its yaw axis, and the input demand to said second servo system is dependent upon a demand for movement of the aircraft parallel to its roll axis.

7. In an aircraft, a control system according to claim 1 including a control handle which is available to the pilot of the aircraft and which is rotatable about each of two mutually inclined axes, and means for deriving said first and second signals in accordance with rotations of the handle about different ones of said axes respectively.

8. In an aircraft, a control system according to claim 1 wherein said first and second signals supplied as input demands to said two servo systems are dependent upon demands for angular movement of the aircraft.

9. A control system according to claim 8 wherein the demands for angular movement of the aircraft are supplied by an autostabilizer in the aircraft.

10. A control system according to claim 1 including an accelerometer for providing a signal dependent upon acceleration of the engine installation in space, and means for including in said first signal a component dependent upon the signal provided by said accelerometer.

11. A control system according to claim 1 wherein two servo systems effect control of thrust magnitudes due to different parts of the engine installation, the latter servo systems being supplied with input demand signals that are dependent upon demanded thrust components parallel to one another.

12. A control system according to claim 11 wherein a single servo system controls the thrust directions due to both said parts of the engine installation.

13. A control system according to claim 1 and for use in controlling a plurality of aircraft engine installations of the kind in which thrust produced by the installation is controllable in both magnitude and direction for varying the components of the thrust which act parallel to two mutually, inclined axes, said including a plurality of pairs of servo systems, there being one said pair of each engine installation. the two servo systems of each pair being operative to effect control of the thrust magnitude and thrust direction due to at least part of the relevant engine installation in accordance with two signals which are dependent upon demanded thrust components parallel to the two axes respectively and which are supplied as input demands to the two servo systems respectively, each of these latter servo systems being operative to effect its relevant control of the engine installation in dependence upon the difference between the input demand it receives and a function which is dependent upon both said thrust magnitude and thrust direction provided by the engine installation.

14. In an aircraft having engine installations spaced from one another laterally of the aircraft and symmetrically with respect to the roll axis, a control system for controlling components of thrust produced on the aircraft parallel to its roll and yaw axes by said installations, the control system comprising: means for providing a demand for movement of the aircraft parallel to the yaw axis; means for providing a demand for movement of the aircraft parallel to the roll axis; a plurality of sevo arrangements which are associated one with each said engine installation and which each comprise first and second servo systems for providing control outputs controlling the thrust magnitude and thrust direction due to the associated engine installation, each said servo system including degenerative-feedback means which is responsive to the control outputs of the first and second servo systems to provide degenerative feedback in accordance with a predetermined function of said thrust magnitude and thrust direction provided by the associated installation; means responsive to the demand for movement parallel to the yaw axis to supply input demands dependent thereon to the said first servo systems of all said servo arrangements; and means responsive to the demand for movement parallel to the roll axis to supply input demands dependent thereon to the said second servo systems of all said servo arrangements.

15. A control system according to claim 14 including means for providing two demands for angular movements of the aircraft about its roll and yaw axes respectively, the input demands supplied to the first servo systems being dependent upon the demand for angular movement about said roll axis, and the input demands supplied to the second servo systems being dependent upon the demand for angular movement about said yaw axis.

16. A control system according to claim 14 wherein each said engine installation is so arranged that control of the thrust magnitude due to different parts of the installation is effected by different servo systems, the latter servo systems being supplied in each case with input demands that are dependent upon demanded thrust components parallel to one another.

17. A control system according to claim 16 wherein in the case of each said engine installation a single servo system is arranged to control the thrust directions due to both said parts of the engine installation.

18. A control system according to claim 16 including means for providing a demand for angular movement of the aircraft about its pitch axis, and wherein in the case of each said engine installation the input demands to the different servo systems that control the thrust magnitudes of the different parts of the installation are arranged to be dependent upon the said demand for angular movement about said pitch axis.

19. In combination with an aircraft engine installation that includes at least one vectored-thrust jet engine of the kind having a jet-deflection nozzle the rotation angle of which is variable to vary the direction of thrust produced and a throttle the setting of which is variable to vary the thrust magnitude, a control system comprising: first means to supply a first signal dependent upon demanded thrust magnitude parallel to a first of two mutually-inclined axes; second means to supply a second signal dependent upon demanded thrust magnitude parallel to the second of said axes; a first servo system responsive to said first signal to control the setting of said engine throttle; and a second servo system responsive to said second signal to control the rotational setting of said engine nozzle; each said servo system including degenerative-feedback means which is responsive to the throttle and nozzle settings provided by said two servo systems to provide degenerative feedback in accordance with a predetermined function of both the thrust magnitude and thrust direction of the installation, the predetermined function being different for the different ones of the two servo systems.

References Cited
UNITED STATES PATENTS

| | | | |
|---|---|---|---|
| 3,028,126 | 4/1962 | Holleman | 244—83 |
| 3,096,050 | 7/1963 | Snowden | 244—76 |
| 3,193,218 | 7/1965 | Ernst et al. | 244—76 |

MILTON BUCHLER, *Primary Examiner.*

A. H. FARRELL, *Assistant Examiner.*